United States Patent
Naudts (12)

(10) Patent No.: US 6,327,247 B1
(45) Date of Patent: Dec. 4, 2001

(54) METHOD AND DEVICE TO CHARACTERIZE CELL TRAFFIC

(75) Inventor: Jan Naudts, Brasschaat (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/135,970

(22) Filed: Aug. 18, 1998

(30) Foreign Application Priority Data

Sep. 18, 1997 (EP) .................................................. 97402179

(51) Int. Cl.$^7$ ..................................................... H04L 12/26
(52) U.S. Cl. ............................................ 370/232; 370/253
(58) Field of Search ..................................... 370/229, 230, 370/231, 232, 233, 234, 235, 236, 238, 252, 253

(56) References Cited

U.S. PATENT DOCUMENTS

| | | | |
|---|---|---|---|
| 4,771,391 | * | 9/1988 | Blasbalg ................................ 370/230 |
| 5,442,624 | * | 8/1995 | Bonomi et al. ....................... 370/231 |
| 5,881,049 | * | 3/1999 | Beshai et al. ......................... 370/230 |

FOREIGN PATENT DOCUMENTS 9000331   1/1990   (WO) .

OTHER PUBLICATIONS

"Methods of Mathematical Physics" by R. Courant and D. Hilbert vol. II, Interscience Publishers, pp. 32–33.

"Fundamental Limits and Tradeoffs of Providing Deterministic Guarantees to VBR Video Traffic", E. Knightly et al, *Sigmetrics* '95, Ottawa, Ont. Canada, vol. 23, No. 1, May 1995, pp. 98–107.

"Traffic Characterization and Switch Utilization using a Deterministic Bounding Interval Dependent Traffic Model", E. Knightly et al, Proc on INFOCOM '95–Conference on Computer Communications, 14th Annual Joint Conference of the IEEE Computer and Communications Societies, Boston, Apr. 2–6, 1995, published in *IEEE*, vol. 3, Apr. 2, 1995, pp. 1137–1145.

* cited by examiner

*Primary Examiner*—Kwang B. Yao

(57) ABSTRACT

To characterize cell traffic of a connection at a predefined point in a cell based communications network, an empirical envelope is measured by determining a maximum number of cells of this connection received during a time interval as a function of length of this time interval. This empirical envelope then is Legendre transformed so that a cell traffic characterizing curve representing cell rate (r) through the monitored connection as a function of tolerance ($\tau$) on arrival time of cells of the monitored connection at the predefined point is generated.

19 Claims, 6 Drawing Sheets

METHOD AND DEVICE TO CHARACTERIZE CELL TRAFFIC

The present invention relates to a method to characterize cell traffic of a connection as defined in the preamble of claim 1, and a device adapted to perform this method, as defined in the preamble of claim 2.

Such a method and device are already known in the art, e.g. from the article 'Fundamental Limits and Tradeoffs of Providing Deterministic Guarantees to VBR Video Traffic', from the authors Edward W. Knightly, Dalls E. Wrege, Jörg Liebeherr and Hu! Zhang. In paragraph 3.1 thereof, measuring an empirical envelope $\epsilon$, which represents the maximum number of cell arrivals within a time interval as a function of the length of this time interval, is proposed to characterize video traffic. The empirical envelope $\epsilon$ is expressed mathematically by the formula (2) on page 102 of the cited article. As is indicated in paragraph 3.2 on page 103, line 6-8, this empirical envelope can be measured by means of leaky buckets.

When the cell traffic in a connection is characterized by the known empirical envelope, the parameters needed for policing the traffic by means of the Generic Cell Rate Algorithm (GCRA) cannot be derived in a simple way. The known technique for cell traffic characterization thus is not optimally suited to determine the GCRA parameters.

An object of the present invention is to provide a method and device to characterize cell traffic of the above known type, but which produce a cell traffic characteristic that is more suitable for determination of the GCRA parameters.

According to the present invention, this object is achieved by the method defined in claim 1 and the device defined in claim 2.

Indeed, by Legendre transforming the known empirical envelope, a cell traffic characterization curve is obtained which represents cell rate in the monitored connection as a function of tolerance on the arrival time of cells of the monitored connection. From this cell traffic characterization curve, the minimum cell rate to be used by the Generic Cell Rate Algorithm for policing the traffic can be read off for each value of the tolerance. On the other hand, this cell traffic characterizing curve allows to read off the maximum tolerance allowable for a source which transmits at a certain cell rate, and which is policed by the GCRA algorithm.

An additional advantage of the method according to the present invention is that the accumulation of data is separated from the representation thereof in the form of a cell traffic characterizing curve. A consequence of this independent nature of data accumulation and data representation is that the representation parameters such as the accuracy and range can be modified without any effect on the data accumulation phase. In the known method, any change in accuracy or range implies a complete new measurement of the empirical envelope.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Similarly, it is to be noted that the term 'coupled', also used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

An additional feature of the device according to the present invention is defined in claim 3.

In this way, the empirical envelope becomes real-time measurable without the use of complex hardware resources like the parallel leaky bucket structure proposed in the above cited article. Indeed, as is indicated in paragraph 3.2 of the article written by E. W. Knightly et al., measuring N points of the empirical envelope to constitute therefrom a piecewise linear approximation of the empirical envelope requires a parallel structure of N leaky buckets. The hardware complexity hence is linearly proportional to the number of points measured when using the known technique. This parallelism in hardware resources is avoided according to the present invention.

It is noticed that the two cells of the connection in between which the interarrival time is measured are not necessarily subsequent cells of that connection. If however the two cells are no subsequent cells of the connection, their interarrival distance can always be calculated from interarrival distances between subsequent cells of the connection. This means that measuring interarrival times between subsequent cells suffices to be able to determine the interarrival time in between any arbitrary pair of cells of the monitored connection. More details with respect hereto are given later.

Another additional feature of the present device is defined in claim 4.

The interarrival time between the two non-idle cells, i.e. the two cells which belong to the connection that is monitored, is thus determined as an integer amount of idle or non-idle cells received during that interarrival time. This is so because each cell transmission time corresponds to the receipt of either an idle or a non-idle cell.

Also an additional feature of the present invention is defined in claim 5.

As already indicated above, the interarrival time determination means has to measure the interarrival time only for subsequent non-idle cells. All other interarrival times between cells of the monitored connection can then be calculated from the measured interarrival times by simply adding them together.

Yet another additional feature of the present device is claimed in claim 6.

Indeed, the lowest cell rate for which the cell traffic characterizing curve has to be determined, defines the maximum interarrival distance that can be measured between two subsequent cells of the connection and thus also the word length to be foreseen for the counter means. A concrete example illustrating the choice of the word length of the counter means will be given later.

It is further remarked that the counter should be implemented so that it does not overflow in absence of non-idle cells. In the latter situation, the counter has to stop at its maximum value.

A further feature of the present invention is defined by claim 7.

Thus, the length of the time interval determines the memory locations that will be accessed, and the data stored at the addressed memory locations represent the maximum number of cells of that connection received during a time interval of that length.

It is noticed that the maximum number of cells of the connection received during a time interval with a certain length is also the maximum number of cells received during any time interval with a greater length, provided that there was no other time interval of this greater length during which more cells were received. Thus, the counted maximum number of cells will be memorized on several subsequent memory locations.

Another further feature of the present invention is defined in claim 8.

In this way, data accumulation and storage in the memory means can overlap in time with data representation of the previous measurements. Alternatively, if data accumulation takes too much time, overlap in time between data accumulation and data representation can be realised by executing the Legendre transformation repeatedly on partial results of an ongoing measurement.

Also a further feature of the present device is described in claim 9.

In this way, by temporarily storing and processing information, the number of memory accesses can be reduced significantly as will be shown later. Optimizing this number of memory accesses by intelligently pre-processing the information is important for real-time cell traffic characterization of the connection.

Moreover, a further feature of the present device is defined in claim 10.

Indeed, as will be explained later on, the number N of time interval values stored in the buffer is related to the width of the words stored in memory.

Yet another further feature of the device according to the present invention is defined in claim 11.

From two interarrival times, a third interarrival time is calculated if the second cell of the first interarrival time equals the first cell of the second interarrival time. This third interarrival time than can be used to address an additional location in the memory where the sum of the maximum numbers of cells received during the first and second interval times is stored. As a result, interarrival times of non-subsequent cell pairs are obtained.

Still a further feature of the present device is defined in claim 12.

The above mentioned third interarrival time, obtained by combining measured interarrival times, indeed should not exceed a maximum interarrival time determined by the lowest cell rate for which one wishes to measure the characterizing curve. If the buffer stores interarrival times measured between subsequent pairs of cells of the connection and if the addition means is a cumulative register, the addition means generates a sequence of increasing interarrival times until it is stopped by the adder reset means.

Furthermore, an advantageous feature of the device according to the present invention is defined in claim 13.

Indeed, in case one is measuring in a range of large tolerance values, a number of the least significant bits can be disregarded. On the other hand, in case one is measuring the traffic characterization curve in a range of small tolerance values, a number of the most significant bits can be disregarded. In this way, the word length for measuring interarrival times is reduced, requiring a reduced processing time and reduced storage capacity in the memory means. It is to be remarked however that absence of non-idle cells should always translate in the maximum value of the truncated words.

Another advantageous feature of the present device is defined in claim 14.

Hence, by leaving out some of the measured interarrival times, the data to be processed and stored in the memory are further reduced which is certainly advantageous for real-time traffic characterization. The criterion to be used for excluding interarrival times for being processed is not further specified but it is evident that lots of alternatives can be considered.

Moreover, an advantageous feature of the present device is defined in claim 15.

In this way, an amount of cells of the connection received within a time interval is stored in memory only when it is larger than the value already stored in memory for a time interval of that length. Doing so, the maximum amount of non-idle cells within a time interval is memorized for each time interval length.

Yet a further advantageous feature of the device according to the present invention is claimed in claim 16.

In this way, if one keeps track of the largest interarrival time that has been used to address a memory location, the remainder of the memory can be supposed to be filled with the value stored at this largest address. This is so because the empirical envelope is a non-decreasing curve. If however an interarrival time larger than the highest address is measured, it is no longer sufficient to store the counted number of non-idle cells received at the memory location addressed by this new interarrival time. All memory locations with addresses in between the former largest address and the new largest address have to be filled with the value stored at the former largest address. This filling is triggered when the comparator detects that the newly measured interarrival time exceeds the largest interarrival time used for addressing.

Still an advantageous feature of the present invention is defined by claim 17.

The filling procedure described in the previous paragraph obviously is only executed when the counted amount of non-idle cells received within this larger interarrival time supersedes the highest value stored in memory since the traffic characterization otherwise would not respect the non decreasing property. The filling procedure is speed up when the largest value is stored in a thereto dedicated maximum data register, compared to an implementation of the present invention wherein this largest value has to be read out of the memory during the filling procedure.

Moreover, a particular feature of the present invention is defined in claim 18.

Indeed, to respect the non-decreasing property of the traffic characterizing curve, all smaller values stored at higher addresses of the memory have to be replaced by the currently stored value. This can be realised by a sweep counter which runs over all successive addresses any time a value is stored at a certain address. The sweep counter stops at the first address where a larger value is encountered than the one stored at the certain address.

Yet an advantageous feature of the present invention is defined in claim 19.

In this way, the processing means detects when the sweeping process has to be stopped. As soon as the new value to be stored is smaller than the value already stored at the addressed location, the address sweeping means is interrupted.

The above mentioned and other objects and features of the invention will become more apparent and the invention itself will be best understood by referring to the following description of an embodiment taken in conjunction with the accompanying drawings wherein.

Figure 1:
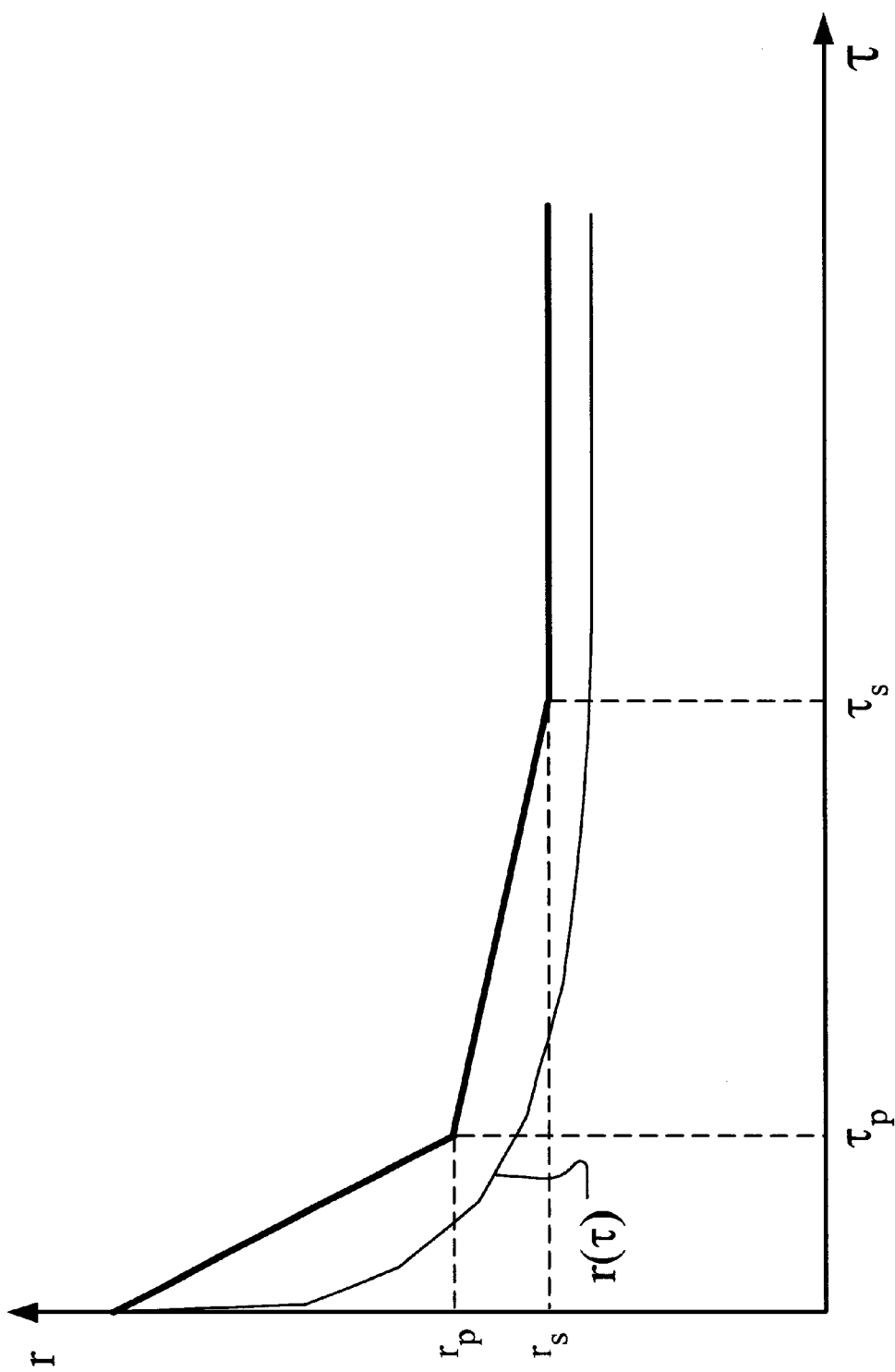
FIG. 1 represent a graph of the traffic characterizing curve, obtained by applying the method according to the present invention.

The empirical envelope proposed for characterization of the cell traffic in a connection in the already mentioned article of E. W. Knightly et al. represents the maximum number s of cells of that connection received at a certain point within a given time span $\delta$, in function of this time span $\delta$. If $t_m$ represents the time of arrival of the m'th non-idle cell and $t_n$ represents the time of arrival of the n'th non-idle cell, the known empirical envelope is given by the formula:

$$s(\delta) = \max\{m - n : t_m - t_n \leq \delta\} \quad (1)$$

Clearly, this empirical envelope $s(\delta)$ is non-decreasing in $\delta$. As already explained above, this empirical envelope $s(\delta)$ is not very suitable for characterizing cell traffic since the GCRA (Generic Cell Rate Algorithm) parameters can not easily be determined thereof. A more suitable traffic characterizing curve represents the peak cell rate r of a connection as a function of tolerance $\tau$ on the arrival time of cells of this connection. This traffic characterization curve is mathematically defined by:

$$r(\tau) = \max\left\{\frac{m - n - \tau \cdot R}{t_m - t_n} : t_m - t_n > \tau\right\} \quad (2)$$

Herein, R represents the cell transmission rate over the transmission line. Clearly, the latter traffic characterization curve $r(\tau)$ is non-increasing in $\tau$. From expression (2) it is derived that:

$$r(\tau) = \max_{\delta > \tau}\left\{\max\left\{\frac{m - n - \tau \cdot R}{\delta} : t_m - t_n = \delta\right\}\right\} \quad (3)$$

$$\leq \max_{\delta > \tau}\left\{\max\left\{\frac{m - n - \tau \cdot R}{\delta} : t_m - t_n \leq \delta\right\}\right\}$$

$$= \max_{\delta > 0}\left\{\frac{1}{\delta} \cdot (s(\delta) - \tau \cdot R)\right\}$$

For $\delta \leq \tau$, one has that:

$$\frac{1}{\delta}(s(\delta) - \tau \cdot R) \leq \frac{1}{\delta}(\delta \cdot R - \tau \cdot R) \leq 0 \quad (4)$$

whilst for $\delta \to \infty$, the expression in (4) becomes non negative. Therefor, in order to prove the inequality (3) in the other direction, it suffices to show that for all $\delta \geq \tau$, one has that:

$$r(\tau) \geq \frac{1}{\delta}(s(\delta) - \tau \cdot R) \quad (5)$$

or equivalently that:

$$s(\delta) \leq \tau \cdot R + \delta \cdot r(\tau) \quad (6)$$

Hence it is enough to show that:

$$t_m - t_n \leq \delta \Rightarrow m - n \leq \tau \cdot R + \delta \cdot r(\tau) \quad (7)$$

Assume that $\tau < \delta$ and $t_m - t_n \leq \delta$. If $t_m - t_n \leq \tau < \delta$ then:

$$m - n \leq R \cdot (t_m - t_n) \leq \tau \cdot R \quad (8)$$

Therefor one can assume that $\tau < t_m - t_n \leq \delta$.

From the definition of $r(\tau)$, given in (2), then follows that:

$$r(\tau) \geq \frac{m - n - \tau \cdot R}{t_m - t_n} \quad (9)$$

so that:

$$m - n \leq \tau \cdot R + (t_m - t_n) \cdot r(\tau) \quad (10)$$

$$\leq \tau \cdot R + \delta \cdot r(\tau)$$

Thus, since the inequality (3) and the inverse thereof are proven, it is concluded that:

$$r(\tau) = \max_{\delta > 0}\left\{\frac{1}{\delta} \cdot (s(\delta) - t \cdot R)\right\} \quad (11)$$

The previous conclusion (11) means that $$\frac{r(\tau)}{R}$$

is the Legendre transform of the function $$\frac{1}{\delta} \to \frac{s(\delta)}{\delta}.$$

An immediate consequence thereof is that $r(\tau)$ is a convex function of $\tau$ and is continuous on the interval $0 < \tau < \infty$. Another consequence is the monotonicity. If an idle cell is transformed into a non-idle cell then, clearly, $s(\delta)$ can only increase. Therefore $r(\tau)$ can only decrease.

The traffic contract for a cell stream of the VBR (Variable Bit Rate) class in an ATM (Asynchronous Transfer Mode) specifies two sets of parameters $(r_p, \tau_p)$ and $(r_s, \tau_s)$ to be satisfied. Herein, $r_p$ represents the Peak Cell Rate (PCR), $\tau_p$ represents the tolerance or Cell Delay Variation (CDV), $r_s$ represents the Sustained Cell Rate (SCR), and $\tau_s$ represents the Burst Tolerance. An upper bound for the traffic characterizing curve of cell traffic in a VBR connection, built up from these two sets of parameters, is drawn in FIG. 1. This means that the cell traffic characterizing curve measured for a VBR source which has to respect the traffic contract with parameter values $(r_p, \tau_p)$ and $(r_s, \tau_s)$ has to lay below this upper bound curve. Such a curve measured for a VBR source is shown in FIG. 1. In the following paragraphs, the device DEV used to measure this curve will be described.

Figure 2:
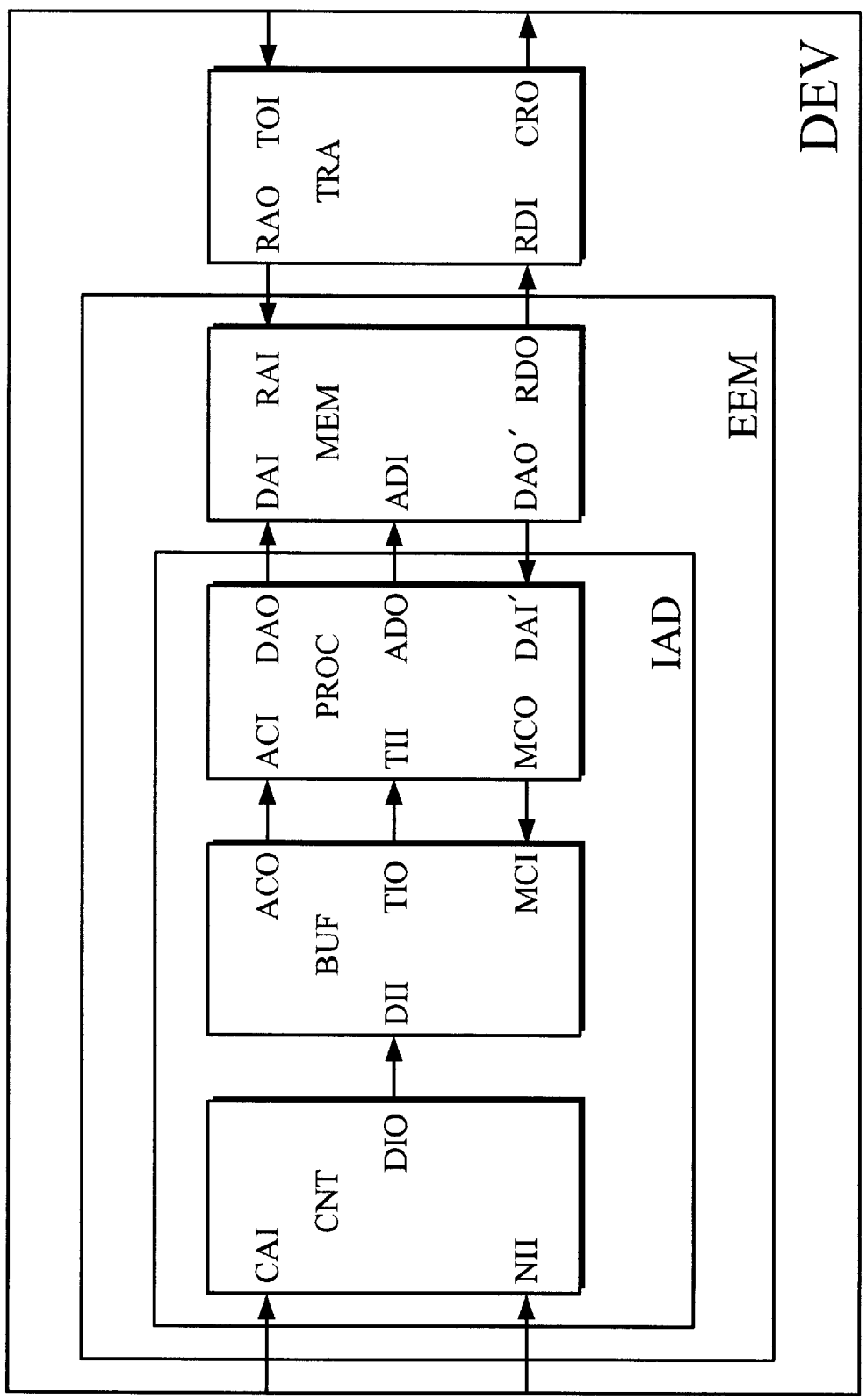
FIG. 2 represents a block scheme of an embodiment of the device DEV to characterize cell traffic according to the present invention.

FIG. 2 shows the functional blocks EEM, IAD, CNT, BUF, PROC, MEM and TRA of an embodiment of the cell traffic characterizing device DEV according to the present invention. The global functions of these blocks and the way wherein these blocks are interconnected will be described in the first following paragraph. A more detailed description of the operation and contents of each of the blocks will be given in later paragraphs wherein reference is made to the figures FIG. 3, FIG. 4, FIG. 5 and FIG. 6 respectively. A description of the contents of the functional blocks on the level of the basic electronic components constituting these blocks however is not given in this patent application since it is expected that any person skilled in the art of electronic design is capable of developing different implementations of these functional blocks given the following description of their operation.

The device DEV drawn in FIG. 2 contains an empirical envelope measurement arrangement EEM and a Legendre transformer TRA. The empirical envelope measurement arrangement EEM thereof comprises an interarrival distance determination arrangement IAD and a random access memory MEM. The interarrival distance determination arrangement IAD includes a counter arrangement CNT, a buffer arrangement BUF, and a processor arrangement PROC.

The counter arrangement CNT is provided with two inputs, a cell arrival input CAI and a non-idle cell input NII which are both input terminals for the whole device DEV. An interarrival distance output DIO of the counter arrangement CNT is coupled to an interarrival distance input DII of the buffer arrangement BUF and this buffer arrangement BUF further has a second input, a maximum cell count input MCI, whereto a maximum cell count output MCO of the processor arrangement PROC is feedback coupled. In addition, the buffer arrangement BUF is equipped with an actual cell count output ACO which is connected to an actual cell count input ACI of the processor arrangement PROC and a time interval length output TIO connected to a time interval length input TII of the processor arrangement PROC. Via a data output DAO and address output ADO, the processor arrangement PROC is connected to respectively a data input DAI and address input ADI of the memory MEM. This memory MEM furthermore has a feedback data output DAO' coupled to a feedback data input DAI' of the processor arrangement PROC, a read address input RAI whereto a read address output RAO of the transformer TRA is coupled, and a read data output RDO coupled to a read data input RDI of the transformer TRA. A tolerance input TOI and cell rate output CRO of the latter transformer TRA constitute an external input and external output of the drawn traffic characterizing device DEV respectively.

The counter arrangement CNT counts the amount of arrived cells in between two subsequent cells which belong to the monitored connection. Such cells which belong to the monitored connection are called non-idle cells throughout this document and their arrival is announced by a boolean signal applied to the non-idle cell input NII. A second boolean signal applied to the cell arrival input CAI indicates that a new cell has arrived at the point where the device DEV is placed, irrespective of the fact that this cell belongs or belongs not to the monitored connection. The counted amount of arrived cells in between receipt of two subsequent non-idle cells is sourced via the interarrival distance output DIO and sent towards the buffer arrangement BUF. This buffer arrangement BUF at any time memorizes the N most recent interarrival distances measured by the counter arrangement CNT and combines subsequent interarrival distances to thereby generate larger interarrival distances. These larger interarrival distances represent time intervals wherein more than one non-idle cell arrived at the point where the device DEV is located. The lengths of the time intervals and the amounts of non-idle cells received therein are applied to the time interval length input TII and the actual cell count input ACI of the processor arrangement PROC respectively. The buffer arrangements BUF, as will be explained later on, further also has a filtering effect on the data received from the counter arrangement CNT in order to reduce the amount of data to be processed by the processor arrangement PROC. Moreover, it is noted that the buffer arrangement BUF is capable of comparing an amount of non-idle cells received within a certain time interval with a maximum amount of non-idle cells received earlier within a time interval having the same length. The latter maximum amount is stored in the memory MEM and applied to the buffer arrangement BUF via the feedback connection to its maximum cell count input MCI. Only if the actual amount of non-idle cells exceeds the maximum amount of non-idle cells received earlier within a time interval of equal length, the actual amount of non-idle cells will be applied to the actual cell count input ACI of the processor arrangement PROC. The processor arrangement PROC uses the memory MEM to store therein an array of non-idle cell counts, received via the actual cell count input ACI. The array is indexed by the time interval lengths, received via the time interval length input TII. The processor arrangement PROC ensures that the array stored in the memory MEM is non-decreasing. The processing steps to be done thereto are optimized in a preferred embodiment of the processing arrangement PROC that will be described in detail later on. As will be seen there, this preferred processing arrangement PROC at any time keeps track of the largest data value stored in the memory MEM and the largest index of the array which has been used to address the memory MEM previously. The non-idle cell counts to be stored in the memory MEM and the time interval lengths to address the memory MEM are supplied to the data input DAI and address input ADI of this memory MEM respectively. The memory MEM is a random access memory. Information stored in the memory MEM that is used either by the processing arrangement PROC or the buffer arrangement BUF is fed back from the memory MEM via the feedback data output DAO'. Concluding, the counter arrangement CNT, buffer arrangement BUF and processor arrangement PROC build up an empirical envelope in the memory MEM which represents the maximum amount of non-idle cells received within a time interval as a function of length of this time interval.

On request of the Legendre transformer TRA, the memory MEM sources stored values via its read data output RDO. The Legendre transformer TRA thereto generates the addresses of the memory locations it wants to read and applies these addresses to the read address input RAI of the memory MEM. Legendre transforming the empirical envelope stored in the memory MEM results in a traffic characterizing curve which represents cell rate as a function of tolerance, as already proved above. For any tolerance value applied to the tolerance input TOI of the Legendre transformer TRA, the latter one is thus able to generate the corresponding cell rate value at its cell rate output CRO.

It is remarked that, to be able to perform its functions correct, each of the functional blocks CNT, BUF, PROC, MEM and TRA is equipped with control inputs and outputs and control logic like counter reset means, enable and disable means for several components, synchronization logic, and so on. Since designing such control logic forms part of the daily work of any person skilled in the art of electronic circuit development, no further attention is drawn thereto in this document.

Figure 3:
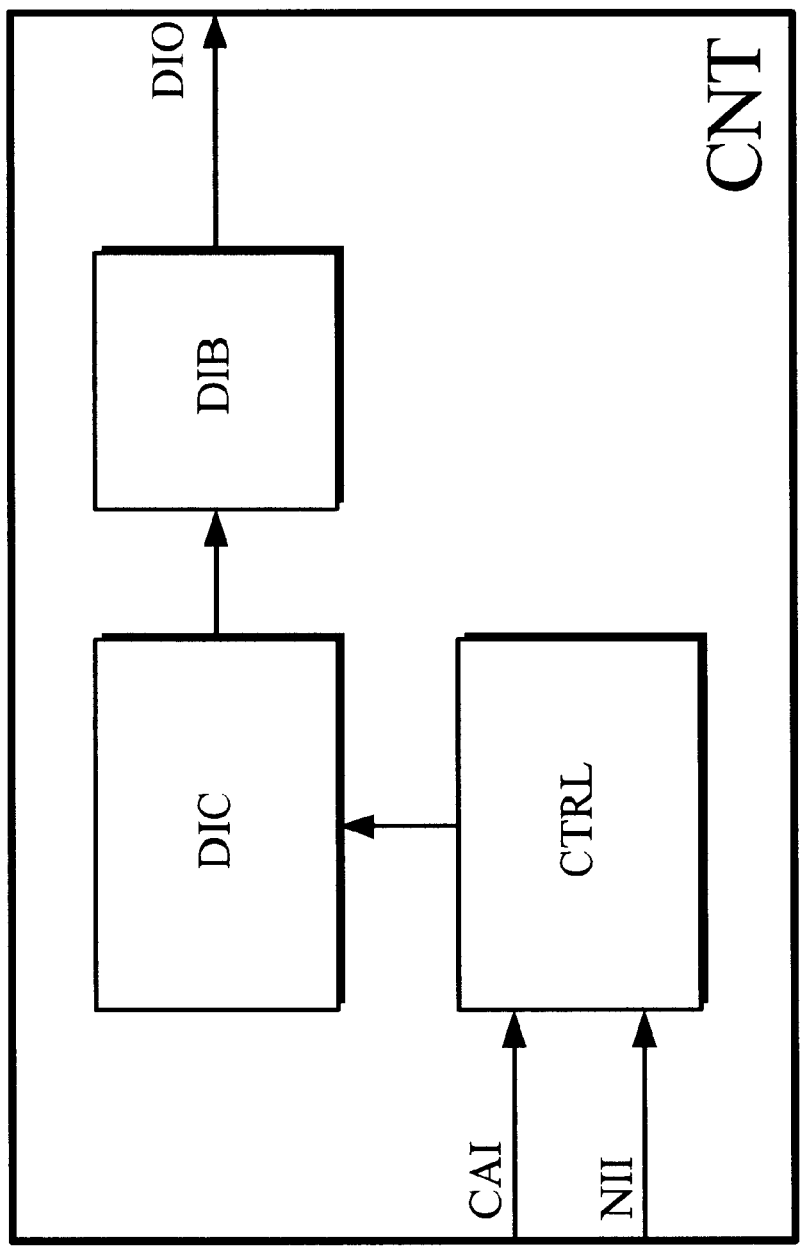
FIG. 3 represents a more detailed block scheme of the counter arrangement CNT of the embodiment of the present device DEV drawn in FIG. 2.

FIG. 3 shows in more detail the contents of the counter arrangement CNT of FIG. 2. This counter arrangement CNT includes a control unit CTRL, an interarrival distance counter DIC, and an interarrival distance buffer DIB.

The cell arrival input CAI and non-idle cell input NII of the counter arrangement CNT are inputs of the control unit CTRL. This control unit CTRL further has an output coupled to a control input of the interarrival distance counter DIC whose output is coupled to the interarrival distance output DIO of the counter arrangement CNT via the interarrival distance buffer DIB.

The interarrival distance counter DIC counts the number of cell arrivals, or equivalently the number of cell transmission times, between receipt of two subsequent non-idle cells. The counter value thereto is increased by one each time the control unit CTRL receives an active signal via its cell arrival input CAI. If an active signal is received by the control unit CTRL at its non-idle cell input NII, the counter DIC is controlled to pass its counter value to the interarrival distance buffer DIB and the counter value is reset to zero. From the interarrival distance buffer DIB, the counted amount of cell arrivals, which is a measure for the time interval in between receipt of two subsequent non-idle cells, is applied to the buffer arrangement BUF of FIG. 2.

It is remarked that the lowest cell rate which should be measured by the device DEV determines the word length of the interarrival distance counter DIC in FIG. 3. Indeed, when placed at a certain point in an ATM (Asynchronous Transfer Mode) transmission line over which information is sent at a bitrate of 155 Mbit/sec or 365566 ATM cells/sec (one ATM cell counts 53 bytes), interarrival times of up to 46 seconds can be measured by a counter with word length of $\log_2 (46 \times 365566) \approx 24$ bits. The interarrival distance counter DIC does not overflow in absence of non-idle cells but is adapted to stop at its maximal value in that case.

Figure 4:
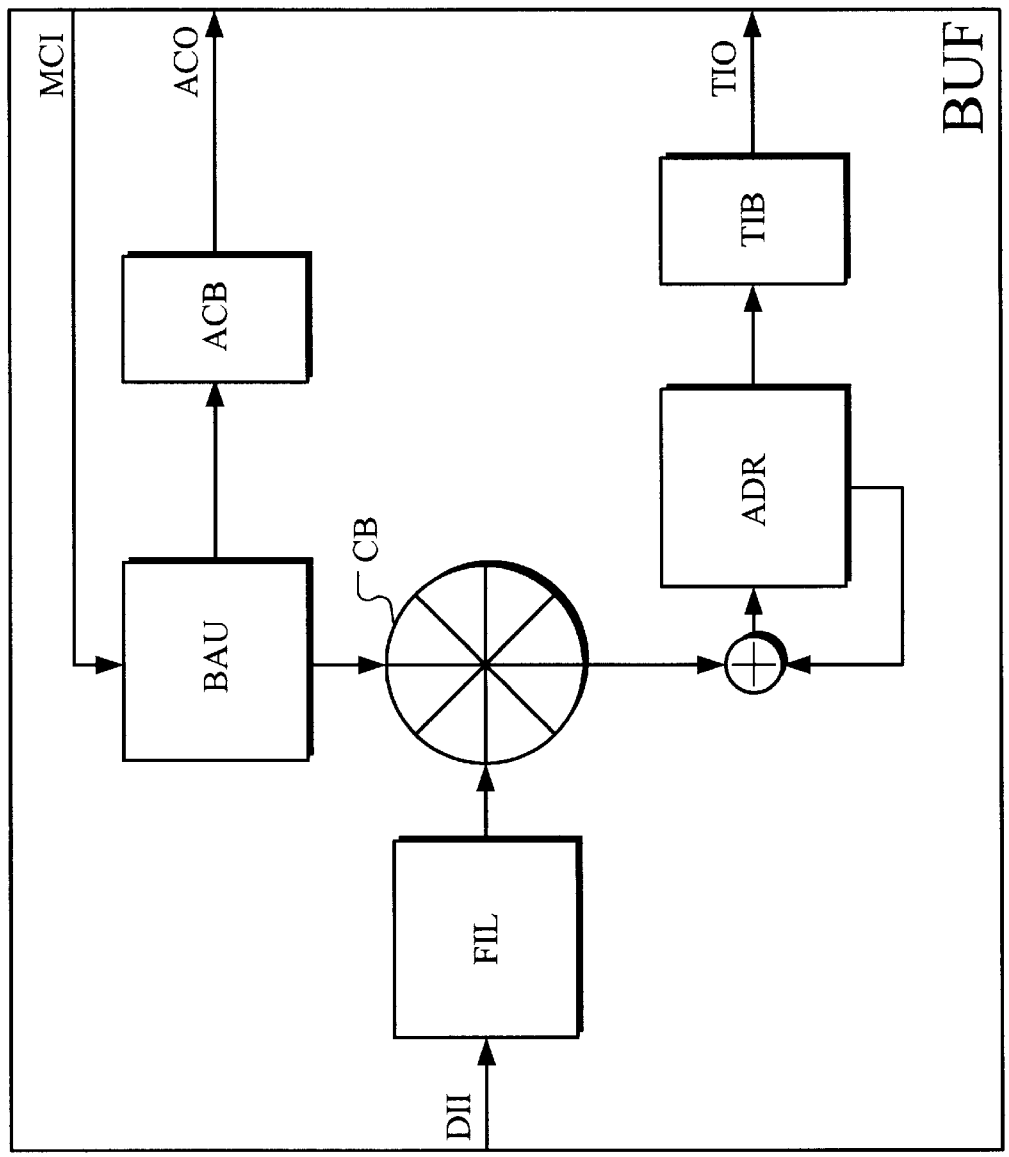
FIG. 4 represents a more detailed block scheme of the buffer arrangement BUF of the embodiment of the present device DEV drawn in FIG. 2.

The contents of the buffer arrangement BUF of FIG. 2 is drawn in detail in FIG. 4. This buffer arrangement BUF contains a data filter FIL, a circular buffer CB, a buffer addressing unit BAU, an actual cell count buffer ACB, an additive register ADR and a time interval length buffer TIB.

The data filter FIL is coupled between the interarrival distance input DII of the buffer arrangement BUF and the circular buffer CB. An output of this circular buffer CB is coupled to the time interval length output TIO of the buffer arrangement BUF via the cascade connection of the additive register ADR and the time interval length buffer TIB. Outputs of the buffer addressing unit BAU are coupled to an input of the circular buffer CB and an input of the actual cell count buffer ACB respectively. This actual cell count buffer ACB has an output connected to the actual cell count output ACO of the buffer arrangement BUF and the maximum cell count input MCI of this buffer arrangement BUF serves as an input for the buffer addressing unit BAU.

The circular buffer CB at any time memorizes the N most recent interarrival distance values which were applied by the counter arrangement CNT to the interarrival distance input DII of the buffer arrangement BUF. From the N interarrival distance values, the additive register ADR generates the interarrival distances or elapsed time intervals between receipt of the last non-idle cell and the N previous non-idle cells. The additive register ADR thereto applies the most recent interarrival distance value to the time interval length buffer TIB, subsequently applies the sum of the two most recent interarrival distance values to the time interval length buffer TIB, subsequently applies the sum of the three most recent interarrival distance values to the time interval length buffer TIB, and so on, until the sum of the N most recent interval distance values is applied to the time interval length buffer TIB. Each value applied to the time interval length buffer TIB is temporarily stored therein so that the processor arrangement PROC of FIG. 2 gets the time to read this value. The value in the circular buffer CB that has to be added to the value in the additive register ADR is addressed by the buffer addressing unit BAU. The buffer addressing unit BAU thereto generates an offset value indicating the relative address of the value to be added, relative to the address of the most recent interarrival distance value stored in the circular buffer CB. This relative address also is the number of non-idle cells received within the elapsed time interval of which the length is generated by the additive register ADR, and thus represents the value to be stored in the memory MEM of FIG. 2 at the address location given by the time interval length calculated by the additive register ADR. For this reason, the address value generated by the buffer addressing unit BAU not only is applied to the address input of the circular buffer CB, but also is applied to the actual cell count buffer ACB. This actual cell count buffer ACB thus temporarily stores an amount of non-idle cells received during a time interval whose length is stored simultaneously in the time interval length buffer TIB. The amount of non-idle cells and the time interval length then can be read by the processor arrangement PROC of FIG. 2 to be processed and used for respectively storage in and addressing of the memory MEM.

To reduce the amount of data transferred from the counter arrangement CNT to the memory MEM in FIG. 2, the buffer arrangement BUF includes at its entrance the data filter FIL. In case one measures the traffic characterizing curve in a range of large tolerance values, the data filter FIL reduces the word length of the incoming interarrival distances by disregarding a number of the least significant bits. Similarly, the data filter FIL omits a number of the most significant bits of incoming interarrival distances in case one measures the traffic characterizing curve in a range of small tolerance values. In these situations, absence of non-idle cells should still result in a maximum value of the truncated interarrival distance words. In addition, the data filter FIL reduces the amount of data to be processed by leaving out some interarrival distance values if the accuracy of the traffic characterization curve does not deteriorate too much thereby.

On the other hand, the buffer addressing unit BAU also is provided with means to reduce the amount of data sent to the processor arrangement PROC. Indeed, since the memory MEM stores for a particular time interval length, the maximum amount of non-idle cells received during a time interval of that length, the actual amount of non-idle cells should only be stored in the memory MEM if it is larger than the maximum amount of non-idle cells received earlier during a time interval of equal length. This maximum amount received earlier is read from the memory MEM and applied via the maximum cell count input MCI to the buffer addressing unit BAU. The buffer addressing unit BAU compares this maximum amount received earlier with the actual amount of non-idle cells. As explained already above, this actual amount equals the relative address value generated by the buffer addressing unit BAU. Only if the relative address value is larger, it is applied to the actual cell count buffer ACB. Otherwise, it is thrown away and the next entry of the circular buffer CB to be considered is that with relative address equal to the maximum amount of non-idle cells received via the maximum cell count input MCI. This is so because of the non-decreasing property of the empirical envelope.

It is to be noticed that, in order to decouple the processing of data in the buffer arrangement BUF from the irregularity of the arrival times of non-idle cells, a small buffer may be inserted at the entrance of the buffer arrangement BUF, i.e. between the interarrival distance input DII and the data filter FIL. It is also noticed that the loop over the circular buffer CB may be interrupted from the moment on the contents of the additive register ADR exceeds a certain threshold value. This threshold value corresponds to an upper limit of tolerance values for which cell rates are to be determined in the traffic characterizing curve. The buffer arrangement BUF is equipped with reset means for the additive register ADR. Optionally, and also dependent on the range of tolerance values for which the traffic characterizing curve has to be measured, some of the most or least significant bits may be disregarded before the data are applied to the next functional block, the processor arrangement PROC of FIG. 2. Furthermore, it is noticed that the choice of N, the number of interarrival distance values stored in the circular buffer CB, is related to the width of the words stored in the memory MEM.

Figure 5:
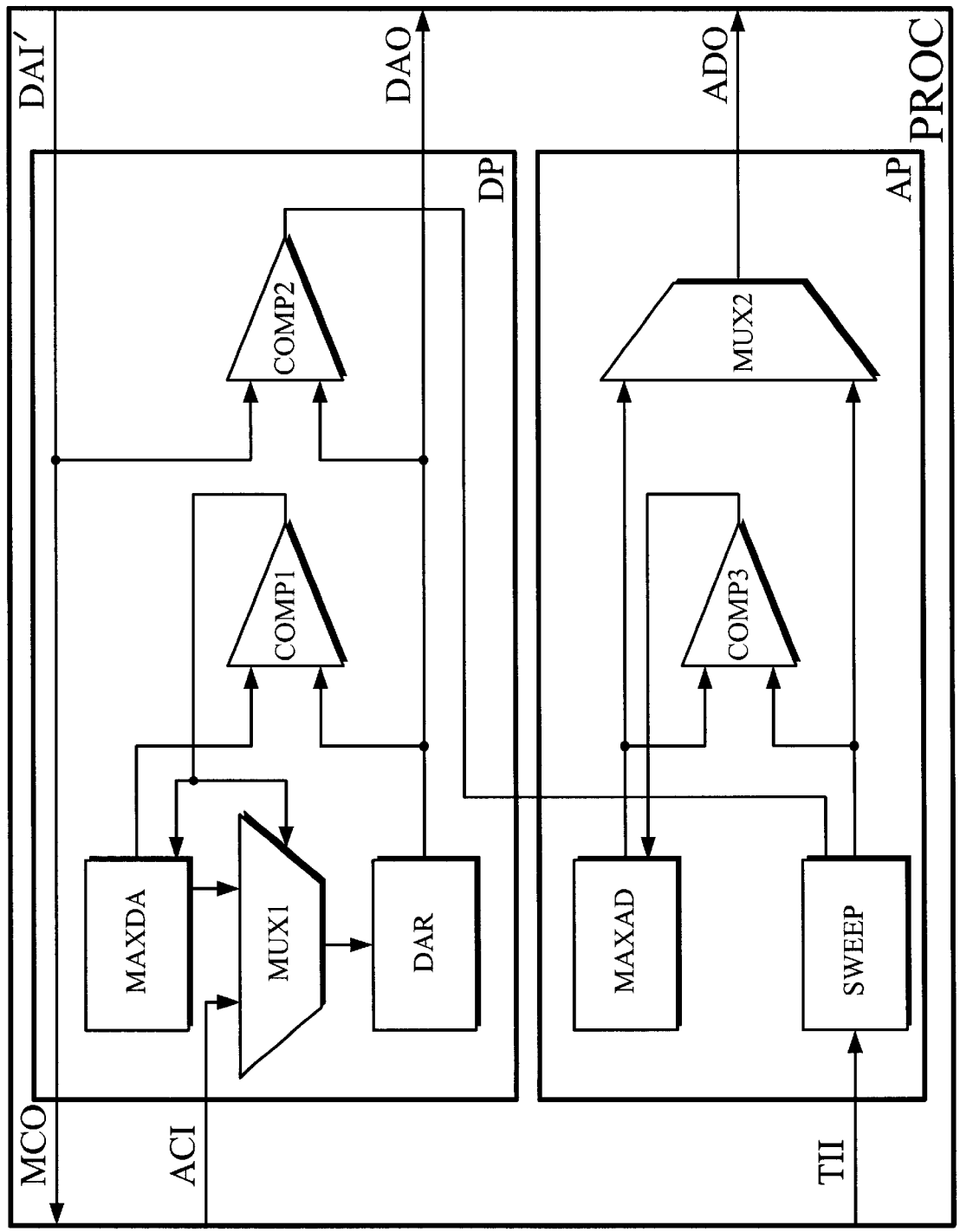
FIG. 5 represents a more detailed block scheme of the processor arrangement PROC of the embodiment of the present device DEV drawn in FIG. 2.

In FIG. 5, the processor arrangement PROC of FIG. 2 is drawn in detail. This processor arrangement PROC includes a data part DP, and an address part AP., the data part DP of which contains a data register DAR, a first multiplexer MUX1, a first comparator COMP1, a second comparator COMP2, and a maximum data register MAXDA. The address part AP on the other hand comprises a sweep register SWEEP, a maximum address register MAXAD, a second multiplexer MUX2, and a third comparator COMP3.

In the data part DP, the actual cell count input ACI and an output of the maximum data register MAXDA are coupled to respective first and second inputs of the first multiplexer MUX1. An output of this first multiplexer MUX1 is connected to an input of the data register DAR and the latter data register DAR has an output coupled to a first input of the first comparator COMP1, a first input of the second comparator COMP2, and the data output DAO of the processor arrangement PROC. An output of the maximum data register MAXDA further is coupled to a second input of the first comparator COMP1, and also the second comparator COMP2 is equipped with a second input whereto the feedback data input DAI' of the processor arrangement PROC is connected. This feedback data input DAI' and the maximum cell count output MCO of the processor arrangement PROC are interconnected. The first comparator COMP1 with its outputs furthermore is coupled to control inputs of the first multiplexer MUX1 and the maximum data register MAXDA. The second comparator COMP2 has an output coupled to a control input of the sweep register SWEEP in the address part AP.

In the address part AP, the sweep register SWEEP is coupled between the time interval length input TII of the processor arrangement PROC and a first input of both the third comparator COMP3 and the second multiplexer MUX2. An output of the maximum address register MAXAD is connected to a second input of both the third comparator COMP3 and the second multiplexer MUX2. This second multiplexer MUX2 has an output terminal interconnected with the address output ADO of the processor arrangement PROC, and the third comparator COMP3 has an output coupled to control inputs of the maximum address register MAXAD and the second multiplexer MUX2 respectively.

A pair of values, an amount of non-idle cells and a time interval length (expresses as an integer amount of cell transmission times), applied by the buffer arrangement BUF of FIG. 2 to the actual cell count input ACI and time interval length input TII of the processor arrangement PROC are used for storage in the memory MEM. The time interval length thereto is routed through the address part AP of the processor arrangement PROC towards the address output ADO and similarly, the amount of non-idle cells is routed through the data part DP towards the data output DAO of the processor arrangement PROC. In the memory MEM, the amount of non-idle cells then is stored in the memory location addressed by the time interval length. Before storing the amount of non-idle cells in the memory MEM however, the second comparator COMP2 checks whether this amount is greater than the value already stored at the addressed memory location. Only if the new amount of non-idle cells is greater than the earlier memorized value, the second comparator COMP2 allows the new value to be sourced towards the memory MEM. Because of the non-decreasing character of the empirical envelope in the memory MEM, the newly stored value not only has to be memorized in the memory location addressed by the time interval length but also has to be memorized in any subsequent memory location that contains a value smaller than the new one. To realize this, the address part AP contains a sweep counter SWEEP which is initialised by the time interval length value received from the buffer arrangement BUF and which is increased step by step so that all higher memory locations also become addresses and become filled with the same value. The sweep counter SWEEP stops when it reaches the highest address of the array in the memory MEM or when a memory location is encountered wherein already a greater value is stored. It is the task of the second comparator COMP2 to check this and to control the sweep counter SWEEP to stop.

The amount of processing of the processor arrangement PROC is further reduced by keeping track of the highest data value stored previously in the memory MEM, and the highest address value used previously for addressing the memory MEM. This highest address is stored in the maximum address register MAXAD whereas the highest data value is memorized in the maximum data register MAXDA of the processor arrangement PROC. By keeping track of the highest address value, one avoids that the remainder of the array in the memory MEM has to be filled with the highest data value. This can be supposed by convention. A consequence thereof is that, if a new value has to be stored at a memory location with an address higher than the value stored in the maximum address register MAXAD, all memory locations with addresses in between the previous highest address and the new highest address have to be filled with the previous highest data value. Thus, if this situation occurs, the third comparator COMP3 will detect it and will control the second multiplexer MUX2 to select the address value received from the maximum address register MAXAD instead of the address value received from the sweep counter SWEEP, and will apply this address value to the memory MEM via the address output ADO. Simultaneously, the first comparator COMP1 will control the first multiplexer MUX1 to select the data value from the maximum data register MAXDA instead of that coming from the buffer arrangement BUF via the actual cell count input ACI, and to load this data value into the data register DAR. Afterwards, the contents of the maximum address register MAXAD is adapted under control of the third comparator COMP3 and the contents of the maximum data register MAXDA is adapted under control of the first comparator COMP1 so that these registers keep track of the new highest address value and highest data value respectively. The contents of the maximum address register MAXAD is increased one by one until it equals the new highest address.

It is noticed that in a preferred version of the processor arrangement PROC, buffers are foreseen at the time interval length input TII and the actual cell count input ACI. Besides the advantage of decoupling to some extent the processing of the buffer arrangement BUF from the processing of the processor arrangement PROC, such buffers give one the benefit that the current writing loop, i.e. the writing of data on subsequent memory locations of the memory MEM, can be interrupted if the next address-data pair would store a higher data value in the same memory locations.

In the memory MEM of FIG. 2, an array of points of the empirical envelope is built up as described above. The index of the array is the length of time intervals measured in units of cell transmission times. The value stored at a particular index is the maximum amount of non-idle cells that followed a non-idle cell during the timespan indicated by the index. Obviously, a larger index corresponds to a larger or equal value stored at that index.

In a second phase, independent from the phase of building up the empirical envelope in the memory MEM, the data in the memory MEM are transformed. After Legendre transformation, peak cell rates are obtained as a function of tolerance on the arrival time of non-idle cells. Overlap in time between the first phase and the second phase can be realised best by providing two memory banks. Whilst the processor arrangement PROC writes in the first memory bank, the transformer TRA reads out the second memory bank. Alternatively, if measurement time of the empirical envelope is long, it can be desirable to do the transformation repeatedly on partial results of ongoing measurements. In this way, the first and second phase also are executed simultaneously. A simple implementation of the memory MEM uses commercial available random access memories.

Figure 6:
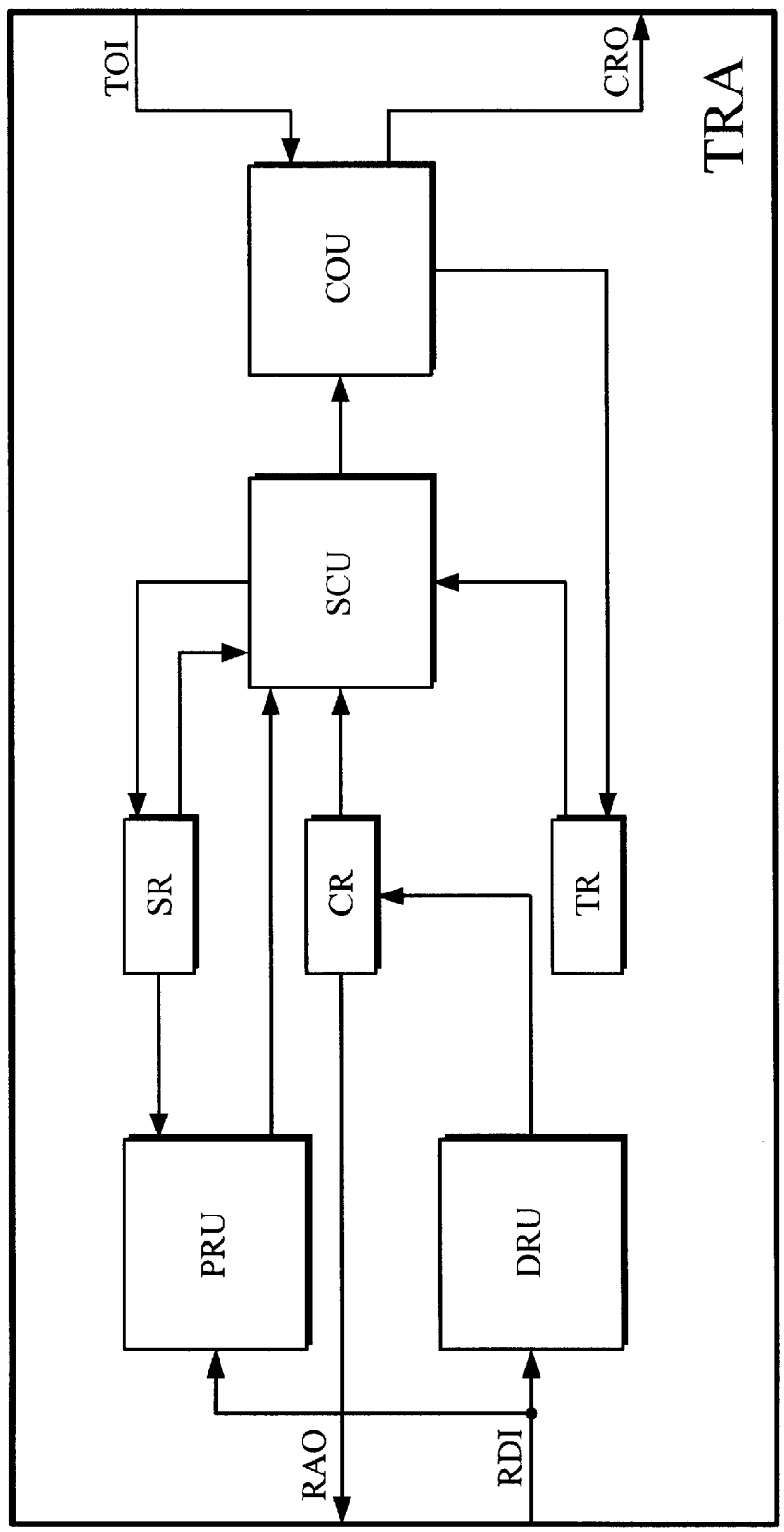
FIG. 6 represents a more detailed block scheme of the Legendre transformer TRA of the embodiment of the present device DEV drawn in FIG. 2.

The transformation arrangement TRA drawn in FIG. 6 includes a slope register SR, a contact point register CR, a tolerance register TR, a slope calculation unit SCU, a predicting unit PRU, a conversion unit COU, and a data reduction unit DRU.

The tolerance input TOI is connected to an input of the conversion unit COU. This conversion unit COU has an output terminal coupled to an input of the tolerance register TR, and a second output terminal interconnected with the cell rate output CRO of the transformation arrangement TRA. On output of the tolerance register TR is coupled to an input of the slope calculation unit SCU. This slope calculation units further has inputs whereto an output of the slope register SR, an output of the contact point register CR, and an output of the predicting unit PRU are coupled respectively. In addition, the slope calculation unit SCU is equipped with an output terminal connected to an input of the slope register SR, and an output terminal coupled to the conversion unit COU. The slope register SR has another output terminal connected to an input of the predicting unit PRU and an output of the contact point register CR is interconnected with the read address output RAO of the transformation arrangement TRA. The read data input RDI of the transformation arrangement TRA is connected to input terminals of both the predicting unit PRU and the data reduction unit DRU, and an output of this latter data reduction unit DRU is connected to an input of the contact point register CR.

The transformation arrangement TRA transforms the data stored in the memory MEM of FIG. 2 and produces the desired result which is the cell rate r as a function of tolerance $\tau$. The transformation that has to be applied thereto is the Legendre transformation, as proven above. A more general name under which this transformation is known is 'contact transformation'. Contact transformations are well known in mathematical literature. In the book 'Methods of Mathematical Physics' from the authors Courant and Hilbert for instance, the use of contact transformations in statistical physics is discussed from page 32 on.

The transformation performed by the arrangement TRA is executed in a single scan over the data array in the memory MEM. The transformation arrangement TRA thereto starts with a lower bound for the slope of the tangent to the data. This lower bound is determined by the slope calculation unit SCU when a tolerance value is applied to the external tolerance input TOI. The tolerance value is memorised in the tolerance register TR whereas the calculated slope value is memorized in the slope register SR. The current value of the slope is used by the predicting unit PRU to predict the data stored in the array at index i. The predicting unit PRU compares the predicted value with the actual data value in the array, received via the read data input RDI, and controls the slope calculation unit SCU to increase the value of the slope if the actual data in the array is larger than the predicted value. So, the contact point of the transformation is placed at i.

It is noticed that the transformation can be made more efficient if the assumption is made that under normal operation tolerances are applied to the tolerance input TOI in increasing sequence. Because the contact point of the transformation can only increase with increasing value of the argument of the transformed quantity, i.e. the tolerance value, the scan of the data array can start at the previous contact point, and move the index up until it is the contact point for the new value of the tolerance.

Similarly, the slope of the tangent, i.e. the cell rate, can only decrease. The previous value of the slope can be used to calculate a lower bound for the new slope by means of the formula:

$$\text{New Slope} = \text{Old Slope} - \frac{\text{Increase in tolerance}}{\text{Old contact point}}$$

An initial lower bound for the slope is the measured density of the cell stream.

Optionally, the data array of the memory MEM can first be reduced before starting the contact transformation. A fairly simple reduction consists of removing those entries which have the same value as the previous entry. Next, one can remove all entries which do not belong to the concave hull. Instead of copying the data of the memory MEM, a system of linked pointers can be used to create a subtable of relevant entries. The data reduction is performed by the data reduction unit DRU.

It is remarked that an implementation of the transformation arrangement TRA with discrete logic using a fixed-point representation for the tolerance and the cell rate is feasible. However, if the optimisations sketched above are also implemented, then the use of a digital processor is preferable.

For conversion of units, the transformation arrangement TRA further is equipped with the conversion unit COU.

While the principles of the invention have been described above in connection with specific apparatus, it is to be clearly understood that this description is made only by way of example and not as a limitation on the scope of the invention.

What is claimed is:

1. Method to characterize cell traffic of a connection at a predefined point in a cell based communications network, said method comprising the steps of:
   a. measuring an empirical envelope by determining a maximum number of cells of said connection received at said predefined point during a time interval as a function of length of said time interval,
   CHARACTERIZED IN THAT said method comprises the additional step of:
   b. Legendre transforming said empirical envelope to thereby generate a cell traffic characterizing curve representing cell rate (r) through said connection as a function of tolerance ($\tau$) on arrival time of said cells of said connection at said predefined point.

2. Device (DEV) adapted to characterize cell traffic of a connection at a predefined point in a cell based communications network, said device (DEV) comprising:

a. empirical envelope measurement means (EEM), adapted to determine a maximum number of cells of said connection received at said predefined point during a time interval as a function of length of said time interval to thereby constitute an empirical envelope, CHARACTERIZED IN THAT said device (DEV) further comprises:

b. transforming means (TRA), coupled to said empirical envelope measurement means (EEM), and adapted to Legendre transform said empirical envelope to thereby generate a cell traffic characterizing curve representing cell rate (r) through said connection as a function of tolerance ($\tau$) on arrival time of said cells of said connection at said predefined point.

3. Device (DEV) according to claim 2,

CHARACTERIZED IN THAT said empirical envelope measurement means (EEM) is provided with:

a.1 interarrival time determination means (IAD), adapted to determine an interarrival time between receipt of two cells of said connection as a measure for said length of said time interval; and a.2 memory means (MEM), coupled to said interarrival time determination means (IAD), and adapted to memorize for said interarrival time said maximum number of cells of said connection received at said predefined point during said interarrival time.

4. Device (DEV) according to claim 3,

CHARACTERIZED IN THAT said interarrival time determination means (IAD) comprises:

a.1.1 counter means (CNT), adapted to count an integer amount of cell transmission times between receipt of said two cells of said connection.

5. Device (DEV) according to claim 4,

CHARACTERIZED IN THAT s aid two cells of said connection are subsequent cells of said connection.

6. Device (DEV) according to claim 5,

CHARACTERIZED IN THAT a word length of said counter means (CNT) is determined by a minimum value of said cell rate through said connection to be defined in said cell traffic characterizing curve.

7. Device (DEV) according to claim 3,

CHARACTERIZED IN THAT said memory means (MEM) is addressed with said interarrival time to store at addressed locations thereof said maximum number of cells.

8. Device (DEV) according to claim 3,

CHARACTERIZED IN THAT said memory means (MEM) comprises:

a.2.1 a first memory segment, adapted to be filled with information sourced by said interarrival time determination means (IAD); and a.2.2 a second memory segment, adapted to be read by said transforming means (TRA), said first memory segment and said second memory segment being adapted to frequently change roles.

9. Device (DEV) according to claim 4,

CHARACTERIZED IN THAT said interarrival time determination means (IAD) comprises:

a.3 buffer means (BUF), coupled to said counter means (CNT) and adapted to temporarily store a plurality of interarrival times similar to said interarrival time; and a.4 processor means (PROC), coupled between said buffer means (BUF) and said memory means (MEM), and adapted to process said interarrival time and said maximum number of cells before storage in said memory means (MEM).

10. Device (DEV) according to claim 9,

CHARACTERIZED IN THAT said plurality of interarrival times that can be stored in said buffer (BUF) is an integer number equal to the word length of said maximum number of cells stored in said memory means (MEM).

11. Device (DEV) according to claim 9,

CHARACTERIZED IN THAT said buffer means (BUF) is provided with:

a.3.1 addition means (ADR), adapted to add together interarrival times measured between subsequent pairs of cells of said connection to thereby constitute an additional interarrival time between two cells of said connection.

12. Device (DEV) according to claim 11,

CHARACTERIZED IN THAT said buffer means (BUF) is provided with:

a.3.2 adder reset means, adapted to reset said addition means (ADR) when said additional interarrival time exceeds a predetermined threshold value.

13. Device (DEV) according to claim 9,

CHARACTERIZED IN THAT said buffer means (BUF) is provided with:

a.3.3 word length reducing means (FIL), adapted to reduce the word length of said interarrival times by eliminating part of the most significant bits or part of the least significant bits thereof.

14. Device (DEV) according to claim 9,

CHARACTERIZED IN THAT said buffer means (BUF) is provided with:

a.3.4 filtering means (FIL), adapted to filter out some of said plurality of interarrival times.

15. Device (DEV) according to claim 9,

CHARACTERIZED IN THAT said buffer means (BUF) is provided with:

a.3.5 comparison means, adopted to compare an amount of cells of said connection received at said predefined point within said interarrival time with a maximum amount of cells of said connection received earlier at said point within an equal interarrival time.

16. Device (DEV) according to claim 9,

CHARACTERIZED IN THAT said processing means (PROC) is provided with:

a.4.1 maximum address storage means (MAXAD), adapted to store a largest interarrival time used earlier for addressing a location in said memory means (MEM); and a.4.2 third comparison means (COMP3), adapted to compare said interarrival time with said largest interarrival time.

17. Device according to claim 16,

CHARACTERIZED IN THAT said processing means (PROC) is provided with:

a.4.3 maximum data storage means (MAXDA), adapted to store a maximum amount of cells of said connection used earlier for storage in said memory means (MEM); and a.4.4 first comparison means (COMP1), adapted to compare an amount of cells of said connection received at said point within said interarrival time with said maximum amount of cells.

18. Device according to claim 9,

CHARACTERIZED IN THAT said processing means (PROC) is provided with:

a.4.5 address sweeping means (SWEEP) adopted to successively address said memory means (MEM) with said interarrival time and with all successive address values for which said memory means (MEM) memorizes a maximum amount of cells of said connection, smaller than an amount of cells actually received within said interarrival time.

19. Device according to claim 18,

CHARACTERIZED IN THAT said processing means (PROC) is provided with:

a.4.6 second comparison means (COMP2), adapted to compare an amount of cells of said connection received at said predefined point within said interarrival time with a data value stored at an address generated by said address sweeping means (SWEEP).

* * * * *